E. W. Tibbels,
Stump Elevator.
N° 78,402. Patented May 26, 1868.
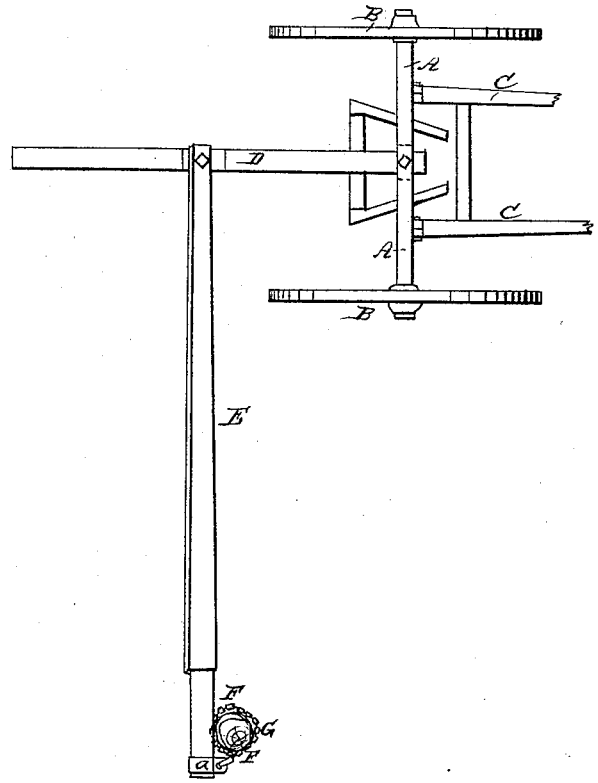
Witnesses
J M Coombs
A Leclerc
Inventor
E. W. Tibbels
per Brown Coombs & C
Atty

United States Patent Office.

EWING W. TIBBELS, OF CHESTER, PENNSYLVANIA.

Letters Patent No. 78,402, dated May 26, 1868.

IMPROVEMENT IN STUMP-EXTRACTOR.

*The Schedule referred to in these Letters Patent and making part of the same.*

TO ALL WHOM IT MAY CONCERN:

Be it known that I, EWING W. TIBBELS, of Chester, in the county of Delaware, and State of Pennsylvania, have invented a new and useful Improvement in Stump-Extractors; and I do hereby declare that the following is a full, clear, and exact description of the same, reference being had to the accompanying drawings, making a portion of this specification, in which—

Figure 1 is a plan view of a stump-extractor made according to my invention.

Figures 2 and 3 are detached views of one portion of the same.

Similar letters of reference indicate corresponding parts in all the figures.

This invention consists in the combination of a wheeled draught-axle, drag-bar, and lever with an attaching-chain and dog, whereby a stump may be wrenched around upon its vertical axis, and loosened and torn from the earth, with a comparatively moderate expenditure of power, that power being exerted in a rotary direction around the stump, at the outer end of the lever.

To enable others to understand the construction and operation of my invention, I will proceed to describe it with reference to the drawings.

A is an axle, furnished at its ends with suitable wheels, B, and having attached thereto the thills C, or any equivalent therefor. Pivoted at its forward end to the centre of the axle is a strong bar, D, the rearmost end of which is suffered to drag upon the ground. Pivoted at any suitable point to this drag-bar D is one end of a strong lever, E, the opposite end of which may be made of cylindrical form, to receive a collar, $a$, having attached thereto a chain, F, to the free or outer end of which is secured a dog, G, formed with a sharp lip or edge, $b$.

In order to use the machine, the lip or edge $b$, of the dog G, is first driven into the side of the stump, I, indicated in fig. 1, and the chain F is coiled around the stump, in the manner shown in such figure, and a horse or other draught-animal being attached to the axle A, between the thills C, the axle is drawn around the stump in a rotary direction, so as to tighten the chain upon the stump, and this draught upon the chain being continued, the stump is wrenched and twisted around its vertical axis, and is thus effectually loosened and torn from the earth, the power required in extracting the stump in this manner being materially less than in those cases where the stump is forced over or tilted laterally, or withdrawn by a vertical movement.

What I claim as my invention, and desire to secure by Letters Patent, is—

The combination of the wheeled draught-axle A, the drag-bar D, and the lever E, with the chain and the dog attached thereto, for operation, substantially as and for the purpose specified.

EWING W. TIBBELS.

Witnesses:
THOMAS CHAMBERS,
JOSEPH H. WOOD.